(12) United States Patent
Jaffard et al.

(10) Patent No.: US 6,852,552 B2
(45) Date of Patent: Feb. 8, 2005

(54) PROCESS FOR SELECTIVE DEPOSITION OF MATERIAL ON BIOSENSOR OR CHIP ELECTRODES MADE ON THE SAME SUBSTRATE

(75) Inventors: Claudine Jaffard, Saint-Egreve (FR); Marc Belleville, St Egreve (FR); Catherine Bour, Le Fontanil (FR)

(73) Assignees: Commissariat a l'Energie Atomique, Paris (FR); Apibio, Marcy L'Etoile (FR)

( * ) Notice: Subject to any disclaimer, the term of this patent is extended or adjusted under 35 U.S.C. 154(b) by 0 days.

(21) Appl. No.: 10/320,690

(22) Filed: Dec. 17, 2002

(65) Prior Publication Data

US 2003/0138768 A1 Jul. 24, 2003

(30) Foreign Application Priority Data

Dec. 27, 2001 (FR) .............................................. 01 16922

(51) Int. Cl.[7] .............................................. H01L 21/00
(52) U.S. Cl. ............................... 438/5; 438/15; 438/16; 438/17; 438/18; 438/14
(58) Field of Search ............................. 438/14, 15, 16, 438/17, 18, 5

(56) References Cited

U.S. PATENT DOCUMENTS

| 5,776,791 A | 7/1998 | Caillat et al. |
|---|---|---|
| 6,251,595 B1 | 6/2001 | Gordon et al. |
| 6,444,111 B1 | 9/2002 | Montgomery |
| 2003/0138768 A1 * | 7/2003 | Jaffard et al. .................. 435/4 |

FOREIGN PATENT DOCUMENTS

| FR | 2 741 476 | 5/1997 |
|---|---|---|
| WO | WO 98/01221 | 1/1998 |

* cited by examiner

Primary Examiner—Matthew Smith
Assistant Examiner—Victor V Yevsikov
(74) Attorney, Agent, or Firm—Oblon, Spivak, McClelland, Maier & Neustadt, P.C.

(57) ABSTRACT

A process for selective deposition of material on electrodes of chips made from a single substrate. The process includes forming a plurality of chips on the same substrate. Each chip includes a plurality of electrodes, address pads, and an address area containing the programmed address of the chip. The address areas are connected to the address pads and capable of recognizing the address of the chip to activate the chip. The process also includes establishing electrical connections to connect the address pads and the plurality of electrodes on each chip for the activation of the chips and polarization of the electrodes. Further, the process includes addressing the chips and electrodes on which a first material is to be deposited, and simultaneously depositing the first material on the addressed electrodes of the activated chips. The addressing and deposition steps are repeated as many times as necessary to make material depositions on the other electrodes.

8 Claims, 3 Drawing Sheets

PROCESS FOR SELECTIVE DEPOSITION OF MATERIAL ON BIOSENSOR OR CHIP ELECTRODES MADE ON THE SAME SUBSTRATE

TECHNICAL FIELD

The invention relates to a process for selective deposition of material on biosensor or chip electrodes made on the same substrate. It relates particularly to microelectronic devices comprising several elements interconnected on the same initial wafer or substrate.

The invention is used for applications in particular for making micro-systems, which in the biological or biochemical analysis field, or more generally in the field of pharmacology tests, involve the analysis of a very large number of points using collective reagent fixation processes on a multi-area plane. These micro-systems may be made by biochips, which are chips composed of an electrical circuit part made on a substrate (for example an electrodes field) and a biological part made on the surface of the chips.

DESCRIPTION OF THE PRIOR ART

One of the techniques used to fix these reagents is electrodeposition on electrically polarized sites of a conducting polymer carrying the chemical or biological species chosen as the reagent. The substrate is electrically connected to the outside and is dipped in a vat containing a solution carrying the chemical or biological species to be deposited. The chosen site is polarized and copolymerization is done. Another solution carrying another reagent is then used. Another site is polarized for a new copolymerization. The cycle is resumed once for each reagent to be fixed.

One useful improvement is to integrate the site addressing electronics in the substrate itself. This technique is sequential. Each site is polarized several times and the substrate is dipped in the reagent carrier solution during each pass.

One of the main limitations to this process is due to the time necessary for operation of the thousands of chips treated individually. Document FR-A-2 741 476 (corresponding to U.S. Pat. No. 5,776,791) discloses application of the process to a wafer (or substrate) on which several chips will be made, which already gives an excellent improvement in the time to make sites functional. Thus, it is possible to treat a large number of chips simultaneously on a single semi-conducting wafer, to selectively deposit a chemical species on determined electrodes of each chip, all chips on a wafer then being treated in parallel.

Several techniques may be used to treat a wafer to obtain several chips. For example, chips may be made using a photorepetition process, and the assembly may be made using a full slice process. It is also possible to make everything using a full slice process.

However, the resulting chips are absolutely identical, regardless of what process is used. The problem then arises about how to obtain different chips on the same wafer without modifying the manufacturing process. It would be very useful to obtain different functionalized chips at the end of the process, obtained by a collective production and functionalization process.

SUMMARY OF THE INVENTION

The present invention overcomes these disadvantages.

It purpose is a process for selective deposition of material on biosensor or chip electrodes made from a single substrate, characterized in that it includes steps to:

a) make a plurality of biosensors or chips on the same substrate, each biosensor or each chip comprising a plurality of electrodes on which selective material depositions have to be made, address pads, an address area containing the programmed address of the biosensor or the chip, connected to the address pads and capable of recognizing the address of the said biosensor or the said chip to put it in an "active" state if the biosensor or the chip address contained in a command word received on the address pads is correct, the substrate also comprising means of making electrical connections to connect the address pads and the plurality of electrodes on each biosensor or each chip to addressing means for activation of the biosensors or chips and polarization of the electrodes, b) addressing of biosensors or chips and electrodes on which a first material is to be deposited, comprising:

successively sending appropriate command words onto biosensor or chip address pads to activate them one after the other, said biosensors or said chips being put in the active state when the appropriate command words are recognized, connection of electrodes that will receive deposition of said first material to polarization means by addressing of these electrodes, c) deposition of said first material simultaneously on the electrodes concerned by the electrodeposition, d) repetition of steps b) and c) as many times as necessary to make material depositions on the other electrodes.

The means of making electrical connections of the substrate used to connect the address pads may include repeaters.

The deposited material may be composed of chemical, biochemical or biological species.

BRIEF DESCRIPTION OF THE FIGURES

The invention will be better understood and other advantages and specificities will become clear upon reading the following description given as a non limitative example accompanied by the attached drawings wherein.

DETAILED DESCRIPTION OF EMBODIMENTS OF THE INVENTION

The invention is used for individual addressing of each biosensor or chip made on a semiconducting wafer in order to obtain better flexibility of use during functionalization, varying from treatment of all biosensors or all chips on the wafer in parallel to individual treatment of each biosensor or each chip. More precisely, the invention consists of using the electrochemical deposition principle on the scale of the wafer, with individual addressing of each biosensor or each chip on the wafer by programming the address of each biosensor or each chip and decoding addresses inside the command word sent in parallel on all biosensors or all chips in the wafer.

The address may also be programmed at several levels. If the biosensors or chips are assembled in a photorepetition field, it is possible to have programming of low order bits of the address by conventional levels inside the field, and programming of high order bits at the wafer over a full slice. It is also possible to program all address bits in a single full slice level, for example using the last level of full slice metallization. A single level is then sufficient to program the biosensor or the chip address and this programming can be read visually on the biosensor or the functionalized chip, in the same way as a barcode.

During functionalization, each biosensor or each chip may be activated individually and remain active while other biosensors or other chips are activated. Then each of the electrodes may be individually connected to the external source (potentiostat) inside each activated biosensor or chip, and therefore be determined as being an attachment site for the reagent.

Treatment of a substrate to form biosensors or chips on it, including their addressing, is identical to the treatment divulged in document FR-A-2 741 476 mentioned above, programming being done during formation of the network of biosensors or chips. The first step is to make one or several identical sets of biosensors or chips on a substrate, each comprising several electrodes and with unconnected address pads. This embodiment is made regardless of what conventional process is used for making the microelectronic devices. The next step is to make an electrical network connecting all biosensors or all chips together either directly, or through a repeater circuit. Each address bit at the same level is connected to each biosensor or chip using a code forming the programming of the biosensor or chip address. The repeater circuit is an additional circuit for redistribution of commands distributed on all biosensors or on all chips, and concentration of one output per biosensor or per chip onto a single common output. When making biosensors or chips by photorepetition, it is possible to make a repeater for each photorepetition field.

Figure 1:
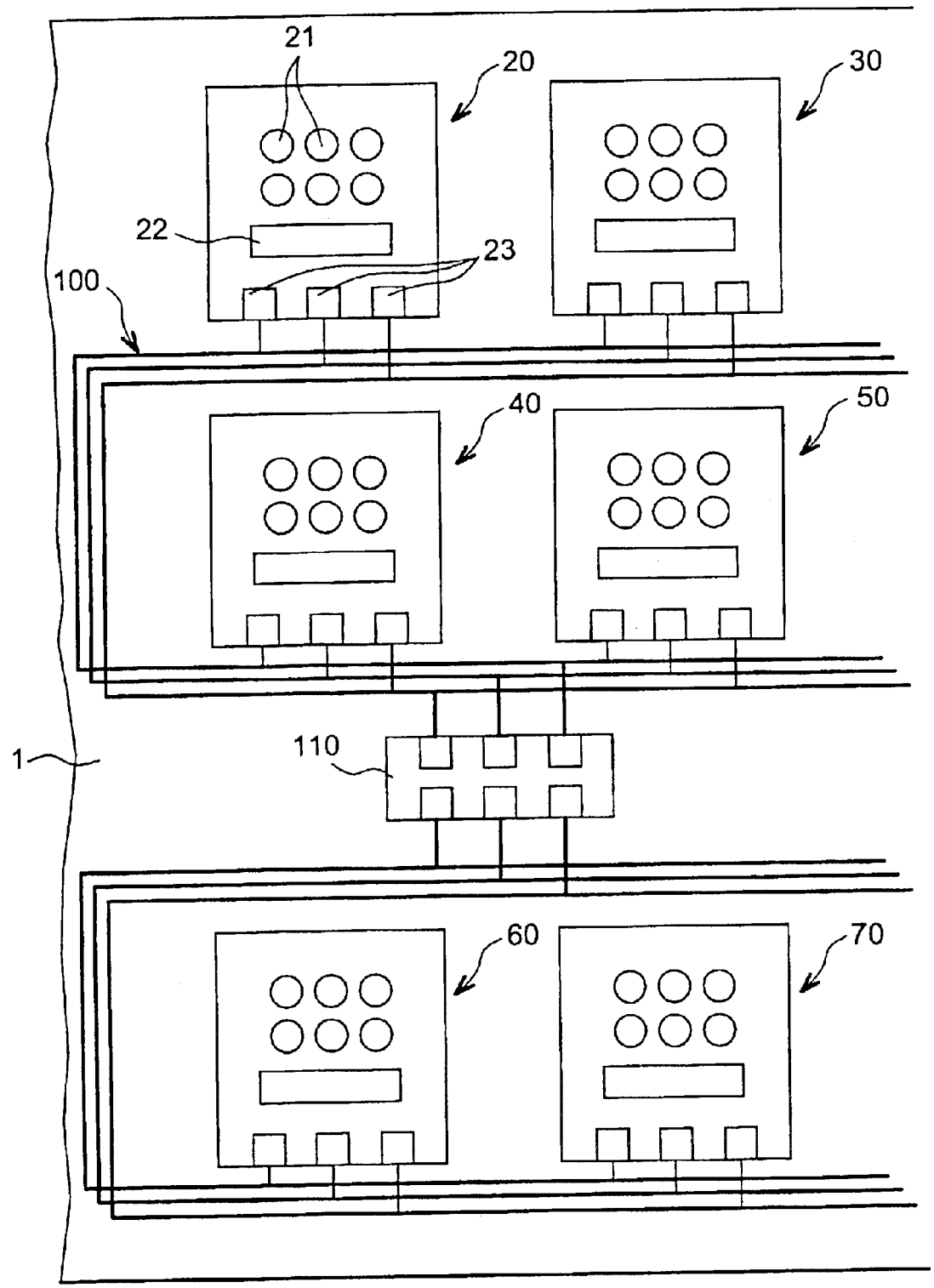
FIG. 1 shows a number of chips made on a semiconducting substrate according to the invention.

FIG. 1 shows part of a semiconducting substrate 1 on which several biosensors or chips 20, 30, 40, 50, 60 and 70 can be seen. Each biosensor or chip is equipped with several electrodes, for example electrodes 21 for the biosensor or the chip 20. Each biosensor or chip is provided with an address area, for example the address area 22 for the biosensor or the chip 20, containing the programmed address of the biosensor or the chip. Each biosensor or each chip is also provided with interconnection pads, for example interconnection pads 23 for the biosensor or the chip 20.

Figure 2:
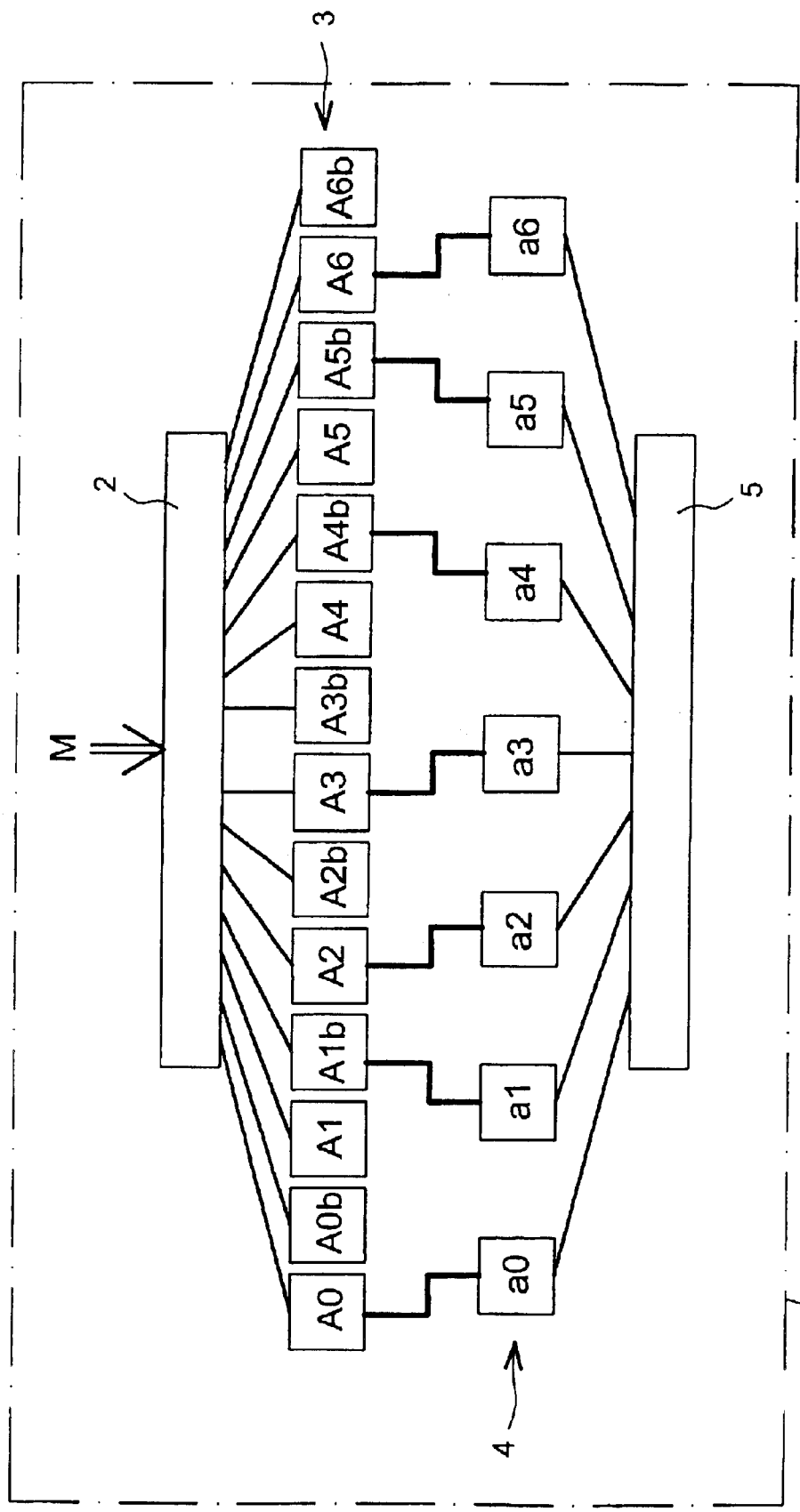
FIG. 2 illustrates the operation to program a chip at an address given by the direct connection method.
Figure 3:
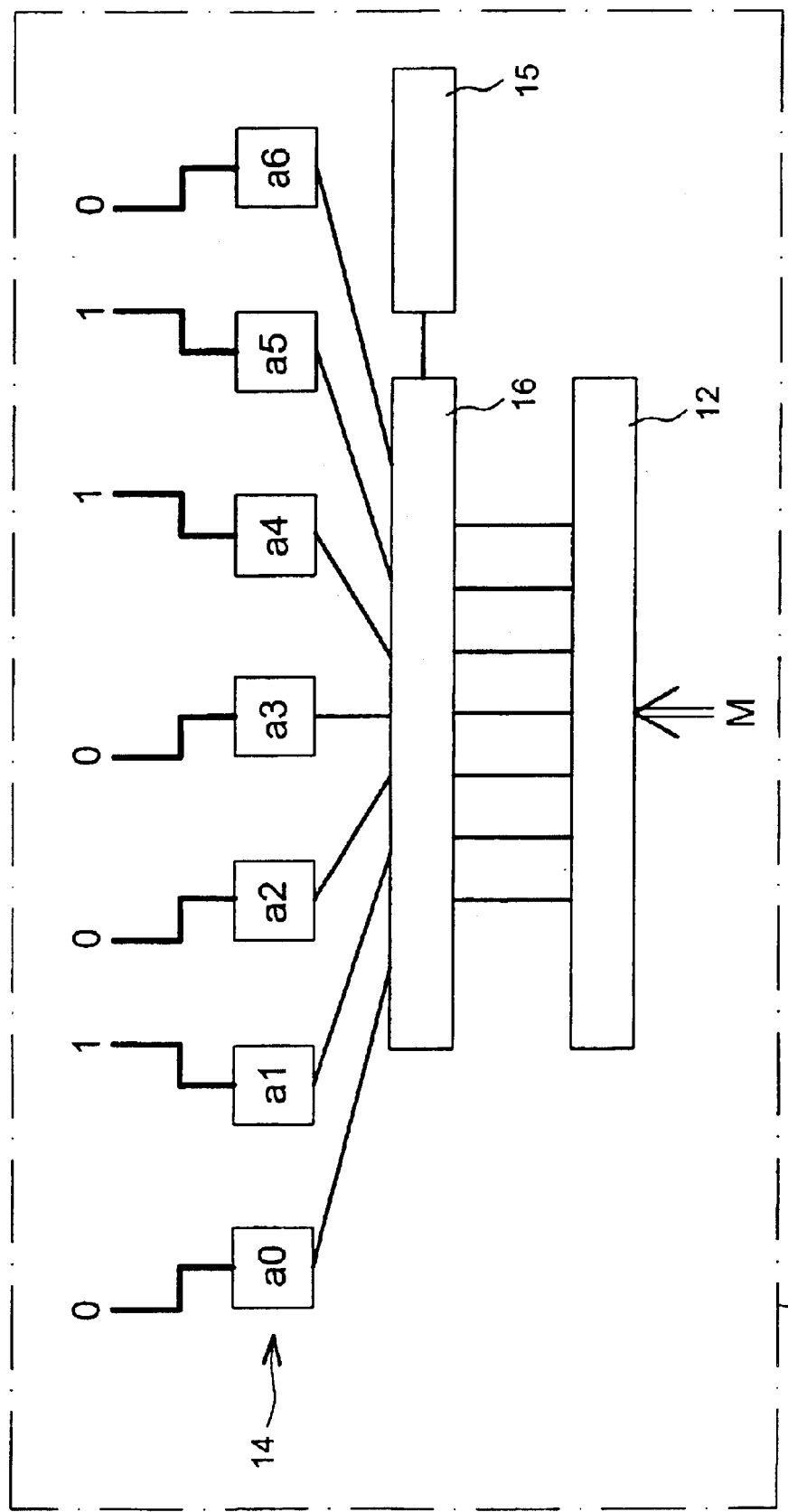
FIG. 3 illustrates the operation to program a biosensor or a chip at an address given by the comparison method.

Different embodiments of the address zone 22 are illustrated as an example by FIGS. 2 and 3.

Reference 100 represents the electrical connections to connect common inputs to all biosensors or to all chips in parallel. A repeater 110 is also shown. For simplification reasons, the electrical connections internal to each biosensor or chip are not shown.

Any electrodeposition process can be used for functionalization of the biosensors or the chips.

The address of the biosensors or the chips and electrodes to be grafted is made as follows. During functionalization, an activation command is sent on all biosensors or all chips on a wafer, containing the address of the chosen biosensor or chip. Command words are decoded at each biosensor or each chip, each biosensor or each chip only recognizes its own address and memorizes its activated state. The required number of biosensors or chips is thus activated. The next step is to connect the electrodes to be grafted on all activated biosensors or chips, by addressing each required electrode.

The electrodeposition operation is then carried out on connected electrodes of the activated biosensors or chips, using a method known in prior art.

The address of the biosensor or the chip to be activated is contained in the activation command. This command is sent to all biosensors or chips on the wafer and the address is decoded by each biosensor or each chip. The number of bits necessary for addressing a biosensor or a chip anywhere on the wafer depends on the size of the biosensor or the chip and the wafer used. For example, 7 bits address is sufficient to address 128 biosensors or chips.

Several techniques can be used for programming the address of a biosensor or a chip.

FIG. 2 illustrates the operation to program a biosensor or a chip at an address given by the direct connection method. The decoding circuit 2 receives a command word M at its input and it outputs the decoded address on pads 3 (from A0 to A6b). Each of the address pads 4 of the biosensor or the chip (from a0 to a6) is connected to the corresponding pad in the decoded addresses or to its complement. The pads 4 then provide the address 0100110 to the usage circuit 5 (in the case in FIG. 2).

FIG. 3 illustrates the operation to program a biosensor or chip at an address given by the comparison method. The decoding circuit 12 receives a command word M as input and it outputs the decoded addresses onto the first inputs of a comparison circuit 16. Each address pad 14 of the biosensor or the chip (from a0 to a6) is connected to second inputs of the comparison circuit 16. The potential of address pads 14 is high or low, depending on the coding. In the case shown in FIG. 3, the biosensor or chip is programmed at address 0100110. The address of the biosensor or chip is compared with the address decoded in the command word. The output from the comparison circuit 16 is connected to the usage circuit 15.

The invention enables an important time saving by putting the functionalization of electrodes in parallel on a full slice, while also leaving the possibility to limit the number of biosensors or chips activated in each pass as required. This gives extremely good flexibility about the final configuration of the different sites in the wafer.

Depending on the use, a single biosensor or chip may be addressed and activated for connection of its electrodes. Similarly, a number of biosensors or chips may be activated one after the other, or even all biosensors or all chips in the substrate may be activated at the same time, and the electrodeposition operation may be done on all activated biosensors or chips.

The invention enables any possible configuration between complete parallelization for treatment of all biosensors or all chips on the substrate, and individual treatment of each biosensor or each chip.

What is claimed is:

1. Process for selective deposition of material on electrodes of chips made from a single substrate, including:

a) forming a plurality of chips on a substrate wherein, each chip of the plurality of chips comprises a plurality of electrodes on which selective material depositions have to be made, address pads, and an address area containing a programmed address of the chip, wherein the address area is connected to the address pads and capable of recognizing the address of said chip to put it in an active state if the chip address is contained in a command word received on the address pads, and establishing electrical connections to connect the address pads and the plurality of electrodes on each chip to the address area for activation of the chips and polarization of the electrodes, addressing the chips and electrodes on which a first material is to be deposited, comprising:

successively sending appropriate command words to the address pads of the chips to activate the chips one after the other, wherein said chips are put in the active state when the appropriate command words are recognized, and establishing a connection of electrodes that will receive deposition of said first material for polarization by addressing the chips and electrodes, depositing said first material simultaneously on the electrodes concerned by electrodeposition, repeating said addressing and depositing steps as many times as necessary to make material depositions on the other electrodes.

2. Process according to claim 1, wherein forming electrical connections is used to connect address pads containing repeaters.

3. Process according to any one of claims 1 and 2, wherein the deposited material is composed of chemical, biochemical or biological species.

4. A process for selective deposition of material on electrodes of chips on a single substrate, including:

forming a plurality of chips on a substrate, wherein each chip of the plurality of chips comprises a plurality of electrodes, address pads, and an address area, wherein said address area contains a programmed address of the chip, recognizes the programmed address of the chip, and activates the chip if the programmed address is contained in a command word received by the address pads;

establishing electrical connections to connect the address pads and the plurality of electrodes on each chip to the address area for activation of the chips and polarization of the electrodes;

addressing the chips and electrodes on which a first material is to be deposited by successively sending command words to the address pads of the chips to activate the chips and establish a connection to addressed electrodes on activated chips that will receive deposition of said first material;

depositing said first material simultaneously on the addressed electrodes; and repeating said addressing and depositing steps as many times as necessary to make material depositions on the other electrodes.

5. The process according to claim 4, wherein establishing electrical connections further comprises connecting the address pads of at least two chips of the plurality of chips using at least one repeater.

6. The process according to claim 4, wherein the deposited material is chemical material.

7. The process according to claim 4, wherein the deposited material is a biochemical material or biological species.

8. The process according to claim 4, wherein the deposited material is a biological species.

* * * * *